June 4, 1935.  D. ŠKORIĆ  2,003,979
DRUM GAME
Filed Oct. 27, 1934
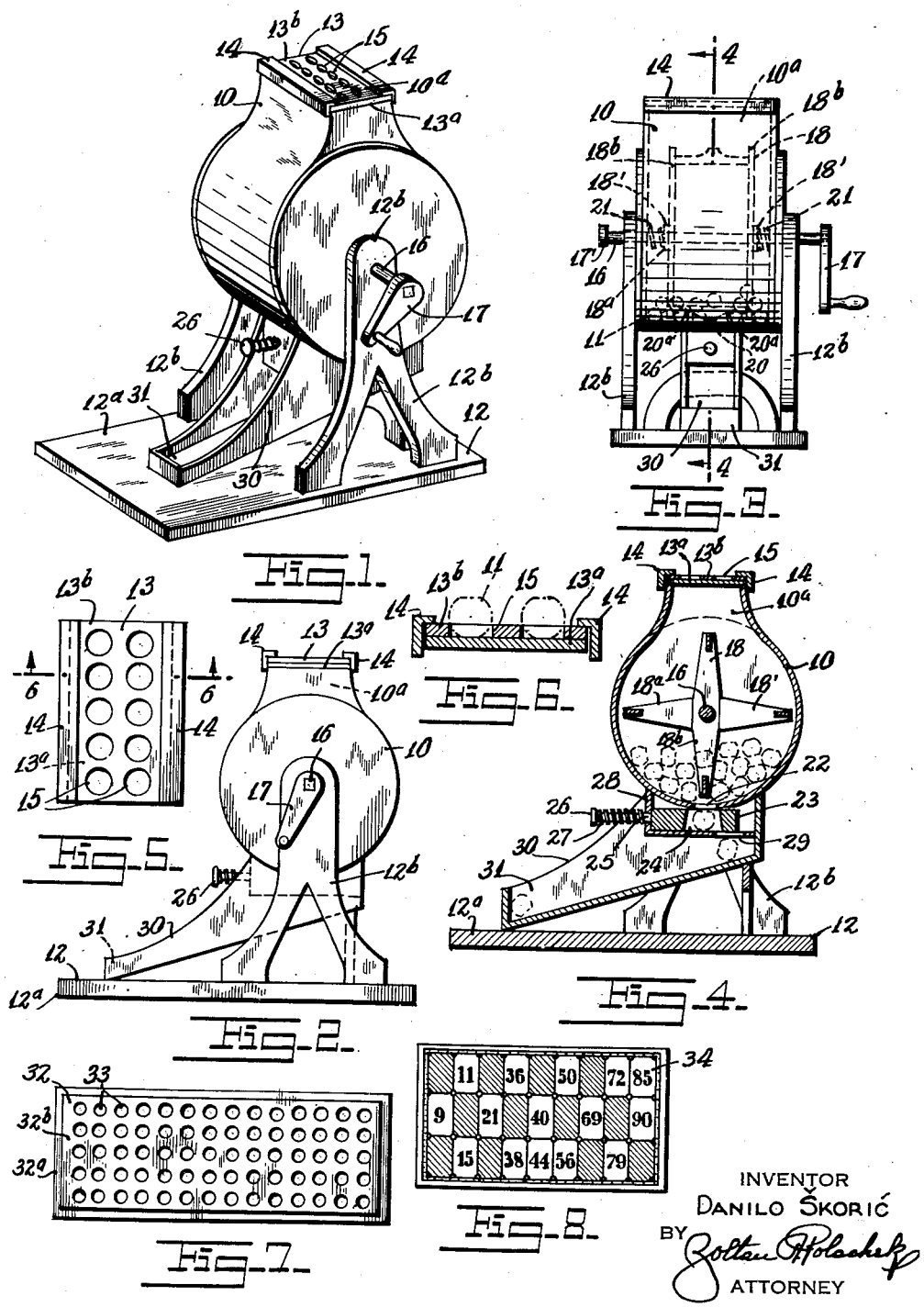
INVENTOR
DANILO ŠKORIĆ
BY
ATTORNEY Patented June 4, 1935

2,003,979

UNITED STATES PATENT OFFICE 2,003,979

DRUM GAME

Danilo Škorić, New York, N. Y., assignor of one-half to Nikola Nirandyitch, New York, N. Y.

Application October 27, 1934, Serial No. 750,235

5 Claims. (Cl. 273—144)

This invention relates to new and useful improvements in a drum game for mixing numbers.

The invention has for an object the construction of an article as mentioned which is characterized by a horizontal cylindrical container for holding numbered balls and an arrangement for mixing the balls and discharging one at a time.

More particularly, the invention has specific reference to a mechanism for the mixing of the balls in a highly efficient manner.

Still further, the invention contemplates the association of a manually controlled discharge with the container, by which one ball may be discharged at a time.

Another one of the objects of this invention is the provision of racks in conjunction with the device, in which the balls may be stored, and checked when desired.

Still further, the invention contemplates the construction of a device as mentioned which is simple and durable and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing, forming a material part of this disclosure:—

Fig. 1 is a perspective view of a device constructed according to this invention.

Fig. 2 is an end elevational view of Fig. 1.

Fig. 3 is a front elevational view of Fig. 2.

Fig. 4 is a vertical sectional view taken on the line 4—4 of Fig. 3.

Fig. 5 is a plan view of a portion of Fig. 2 illustrating one of the racks in detail.

Fig. 6 is a sectional view taken on the line 6—6 of Fig. 5.

Figs. 7 and 8 are elevational views of other racks used with the device.

The drum game for mixing numbers, according to this invention, comprises a horizontal cylindrical container 10 for holding numbered balls 11. A stand 12 serves to stationarily support the container. This stand comprises a base plate 12a upon which there is mounted a pair of support brackets 12b. The container 10 is disposed between the support brackets and fixedly connected with the sides thereof so as to be stationary.

The container 10 is formed with an open top 10a which is closed with a removable rack 13. The opposite sides of the open top are provided with tracks 14 upon which the rack 13 operates. The rack 13 comprises a base board 13a and a top board 13b connected therewith in a unit. The top board is formed with a plurality of openings 15 into which the balls 11 may be stored when desired. The rack may be removed from the top of the container by moving it laterally free from the tracks.

An axial shaft 16 extends through the container and through the brackets 12b and is adapted to be manually rotated. This shaft is provided with a handle 17 on one of the extended ends to facilitate the rotating thereof. The other end of the shaft is provided with a head 17' to prevent its displacement from position. The shaft is slightly longer than the distance between the brackets 12b and is free to move longitudinally as well as to rotate.

A frame 18 is located within the container and is fixed upon the shaft. This frame comprises a pair of spaced side members 18', each consisting of cross arms 18a and 18b. The frame 18 is narrower than the interior of the container so that it may be moved laterally with the shaft 16. Stirring members 20 are mounted between the opposed ends of the side members 18'. These stirring members have parallel pointed areas adapted to extend in among the balls 11 and move certain of the balls when the frame is rotated. These stirring members have recessed areas 20a to the sides of the points thereof arranged so that certain balls are left undisturbed. Resilient means 21 are arranged coaxially on the shaft 16 and serve to hold the frame 18 in a certain neutral position.

At the bottom the container 10 is formed with a discharge opening 22, and is also provided with manually controlled discharge mechanism for discharging one ball at a time. More particularly, this mechanism comprises a slide 23 located beneath the opening 22, and itself formed with an opening 24 adapted in one position thereof to align with the opening 22. This slide may be manually moved by reason of a stem 25 which is attached upon the front side of the slide and which extends to the exterior. The stem 25 has a head 26. A coaxial spring 27 is arranged on the stem and acts between the head and a casing 28. The casing 28 forms a housing for the slide 23 and is attached upon the bottom of the container. The lower side of the casing 28 is formed with an opening 29 located at a position to align with the opening 24 in the slide when the slide is moved rearwards by depressing the stem 25. The opening 29 discharges into a chute 30 having a closed front end 31. The arrangement is such that the discharged balls may be lifted out from the chute.

A rack 32 is provided in conjunction with the drum game. This rack comprises a base board 32a and a top board 32b. The top board is formed with a plurality of openings 33 into which the balls may be set. These openings are numbered and correspond to the balls 11 which are also provided with numbers. The purpose of the rack 32 is that all of the balls may be taken from the device and placed correctly on the rack as a check to ascertain that there are no balls missing.

Another type of rack 34 is illustrated in Fig. 8, in which the layout of the numerals resemble the boards of a lotto game. The winning numbers of the ejected balls 11 may then be utilized to play a lotto or similar game.

The game is played by placing all of the balls within the container and allowing the participants to stir and mix the balls by turning the handle 17 and simultaneously moving the handle laterally to any "guessed" position. After some stirring, the participant depresses the plunger 25 and thus discharges one of the balls. Then further mixing may take place for the discharging of additional balls. The discharged balls are placed in the rack 13. The game is played by a group of players, each playing in the same fashion.

It is to be understood that my device and the various parts thereof may be made of any suitable material, also that the device may be driven by a motor if so desired.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A drum game for mixing numbers, comprising a horizontal cylindrical container for holding numbered balls, a stand for stationarily supporting said container, a manually controlled discharge for the balls in said container, an axial shaft for said container manually rotative and longitudinally adjustable, a frame within said container and fixed on said shaft, and a stirring member for said balls fixed on said frame and co-actable with the mouth of the ball discharge, said container being open at the top, and a rack for the discharged balls removably mounted over said opening.

2. A drum game for mixing numbers, comprising a horizontal cylindrical container for holding numbered balls, a stand for stationarily supporting said container, a manually controlled discharge for the balls in said container, an axial shaft for said container manually rotative and longitudinally adjustable, a frame within said container and fixed on said shaft, and a stirring member for said balls fixed on said frame, and co-actable with the mouth of the ball discharge, said container being open at the top, tracks along the sides of said opening, and a rack for the discharged balls removably mounted on said tracks.

3. A drum game for mixing numbers, comprising a horizontal cylindrical container for holding numbered balls, a stand for stationarily supporting said container, a manually controlled discharge for the balls in said container, an axial shaft for said container manually rotative and longitudinally adjustable, a frame within said container and fixed on said shaft, and a stirring member for said balls fixed on said frame and co-actable with the mouth of the ball discharge, said frame comprising a pair of side members fixed upon said shaft, and the stirring members being mounted between the side members, and resilient means for urging said frame into a normal position.

4. A drum game for mixing numbers, comprising a horizontal cylindrical container for holding numbered balls, a stand for stationarily supporting said container, a manually controlled discharge for the balls in said container, an axial shaft for said container manually rotative and longitudinally adjustable, a frame within said container and fixed on said shaft, and a stirring member for said balls fixed on said frame and co-actable with the mouth of the ball discharge, said frame comprising a pair of side members fixed upon said shaft, and the stirring members being mounted between the side members, each side member comprising a pair of crossed bars and the stirring members being mounted between the pairs of crossed bars and being intermediately formed with projections adapted to move in specific paths.

5. A drum game for mixing numbers, comprising a horizontal cylindrical container for holding numbered balls, a stand for stationarily supporting said container, a manually controlled discharge for the balls in said container, an axial shaft for said container manually rotative and longitudinally adjustable, a frame within said container and fixed on said shaft, and a stirring member for said balls fixed on said frame and co-actable with the mouth of the ball discharge, said frame comprising a pair of side members fixed upon said shaft, and the stirring members being mounted between the side members, each of said stirring members being formed with a projecting point adapted to take a certain path during the stirring of balls contained within said container.

DANILO ŠKORIĆ.